United States Patent Office 3,140,587

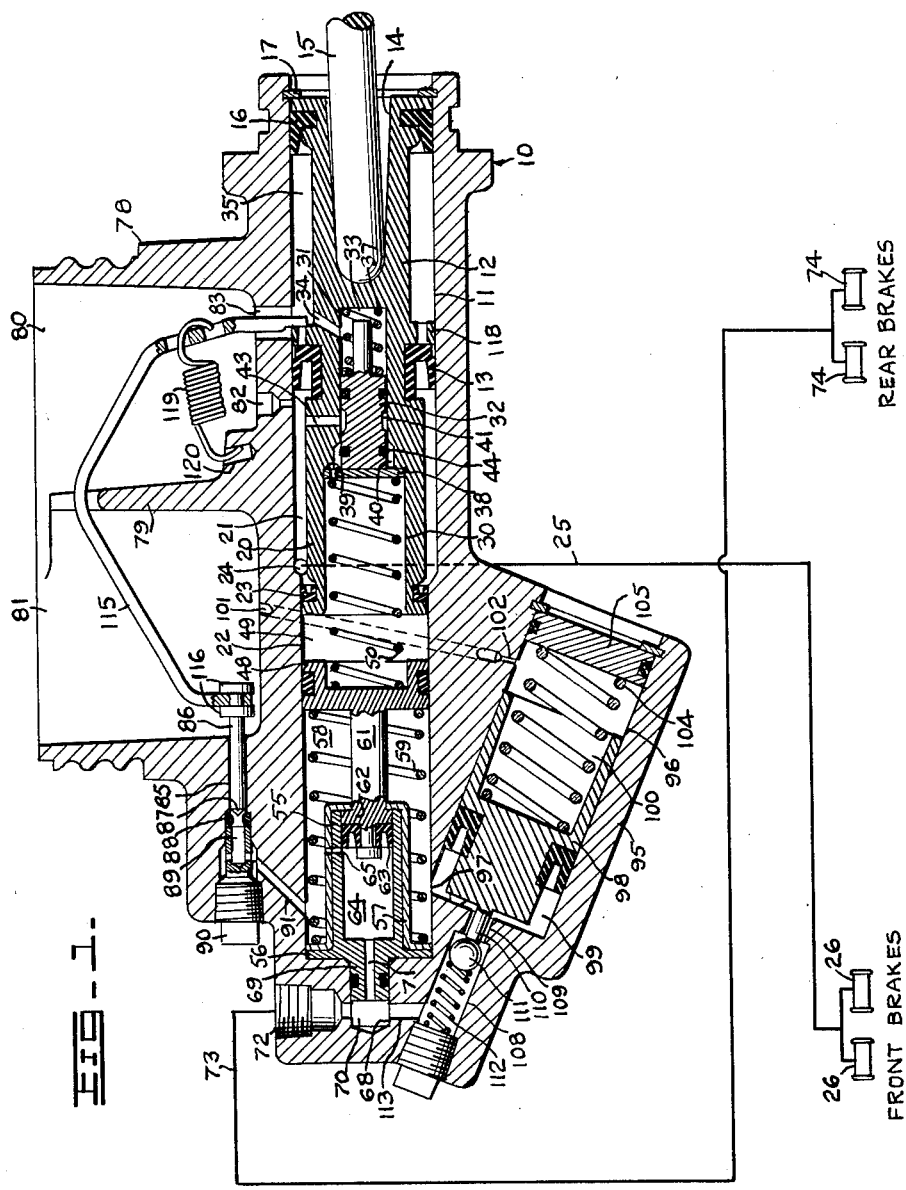

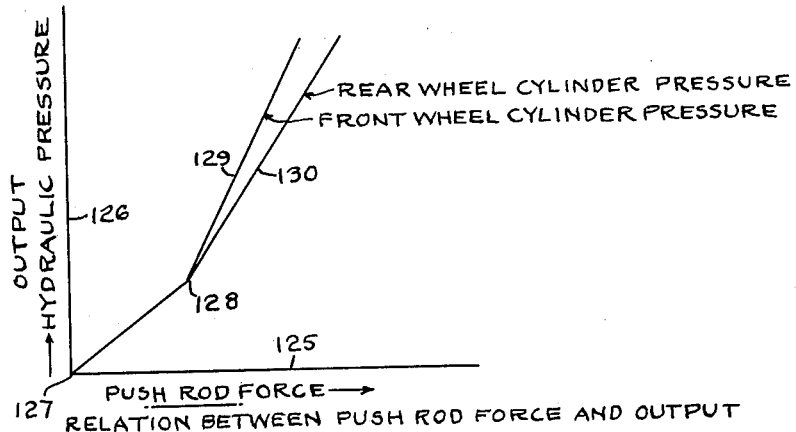
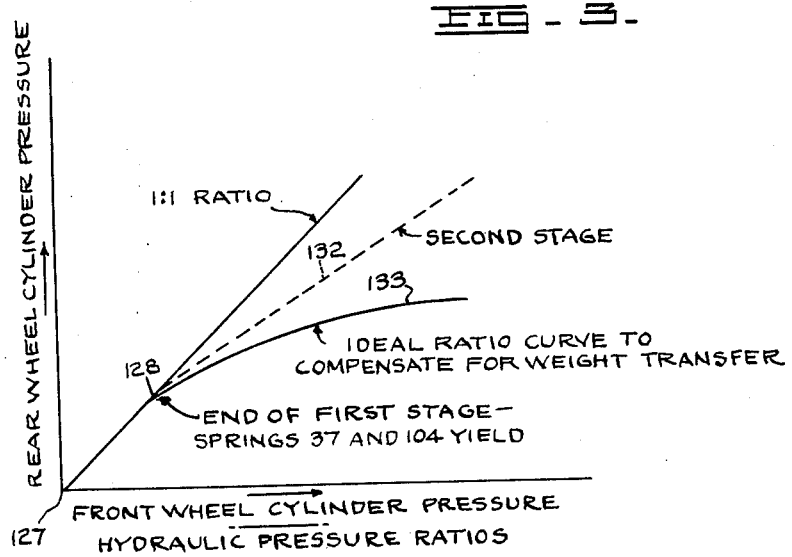

Patented July 14, 1964

3,140,587
DIVIDED OUTPUT COMPOUND MASTER CYLINDER
William Stelzer, Bloomfield Hills, Mich., assignor to Kelsey-Hayes Company, Romulus, Mich., a corporation of Delaware
Filed Jan. 29, 1963, Ser. No. 254,734
15 Claims. (Cl. 60—54.6)

This invention relates to a divided output compound master cylinder for a vehicle brake mechanism, and more particularly to such a master cylinder which is suitable for use with power mechanisms in which a low brake pedal partakes of extremely limited travel for the operation of the valve mechanism and wherein the pedal may be pushed through and beyond its normal range of movement for the direct operation of the master cylinder.

An important object of the invention is to provide an improved compound master cylinder having a divided output providing separate chamber means for operating the front and rear vehicle wheel cylinders and so constructed as to improve the safety of the braking system.

A further object is to provide such a compound master cylinder which is operable through two stages of operation and wherein there is a gradual transition from one stage to the other with stepless modulation during increasing or decreasing braking effort.

A further object is to provide a compound master cylinder which operates to provide a rapid displacement of fluid to all of the wheel cylinders during initial pedal operation, followed by a smaller displacement of fluid to the front and rear brake cylinders at much higher pressure.

A further object is to provide a master cylinder of the type just referred to wherein a stepless modulated action is provided between the two stages of operation and wherein the mechanism operates, in effect, to provide compensation for vehicle body weight transfer toward the front of the vehicle during substantial brake applications.

A further object is to provide such a divided output compound master cylinder wherein the elements necessary to provide such divided output automatically, in effect, compensate for vehicle body weight transfer so that no additional cost is involved to provide specific means for this purpose.

Other objects and advantages in the invention will become apparent during the course of the following description.

In the drawings I have shown one embodiment of the invention. In this showing

FIGURE 1 is an axial sectional view through the master cylinder, the vehicle wheel cylinders and the hydraulic lines being diagrammatically represented, FIGURE 2 is a graph indicating the relation between pedal push rod forces and output hydraulic pressures to the sets of wheel cylinders, and FIGURE 3 is a graph illustrating the relationship during various stages of brake operation of hydraulic pressures delivered to the front and rear wheel cylinders.

Referring to FIGURE 1, the numeral 10 designates the body of the master cylinder as a whole having a bore 11 in which is slidable a plunger 12 having a lipped seal 13. In the rear end of the plunger 12 is formed a socket 14 into which projects a push rod 15 connected to the brake pedal or to the brake operating motor (not shown), if such motor is used. The rear end of the plunger 12 is sealed in the bore as at 16 and normally seats against a snap ring 17 serving as a stop to limit movement of the plunger 12 to off position.

Forwardly of the seal 13, the plunger 12 is axially extended as at 20 and forms with the bore 11 a chamber 21, the rear end of which is defined by the seal 13. The forward end of the plunger extension 20 is slidable in a smaller bore 22 co-axial with the bore 11, and the plunger extension 20 is sealed in the smaller bore as at 23. Near the forward end of the chamber 21, the body 10 is provided with an outlet 24, preferably provided with a residual pressure valve (not shown) leading to a hydraulic line 25 connected to the front wheel cylinders 26.

The plunger extension 20 is provided in its left-hand or forward end with a bore 30 from which extends rearwardly a smaller bore 31 having a plunger 32 slidable therein. This plunger forms with the rear end of the bore 31 a chamber 33 communicating through a port 34 with a chamber 35 rearwardly of the seal 13. A spring 37 biases the plunger 32 forwardly into engagement with a plate 38, the rear face of which seats against a shoulder 39 at the rear end of the bore 30. The plate 38 is apertured as shown and rearwardly thereof the forward end of the bore 31 is slightly enlarged to form a chamber 40 normally communicating with an annular groove 41 around the plunger 32, and which groove communicates through a port 43 with the chamber 21. The plunger 32 is provided with an O-ring 44 acting as a valve to close the chamber 40 to the port 43 when the plunger 32 is displaced rearwardly under conditions to be described.

A second plunger 48 slides in sealing engagement with the bore 22. Between the two plungers there is formed a chamber 49 in which pressure is built up to transmit force from the plunger 12 to the plunger 48 when the push rod 15 is operated, as described below. A spring 50 is arranged in the chamber 49 and engages at opposite ends against the plate 38 and plunger 48.

A cylinder 55 is arranged in the forward end of the bore 22 and is flanged as at 56 at its forward end to seat against the end of the bore 22. A cage 57 surrounds the cylinder 55 and forms with the plunger 48 a chamber 58 in which is arranged a spring 59, engaging at opposite ends against the cage 57 and plunger 48 to bias the latter rearwardly. The spring 59 is stronger than the spring 50.

A plunger 48 is provided with a forwardly extending stem 61 terminating at its forward end in a small piston 62 slidable in the cylinder 55 and sealed as at 63 with respect thereto. The cylinder 55 forms with the piston 63 a chamber 64 communicating with the chamber 58 through a port 65 when the piston 62 is in the normal position shown.

Forwardly of the chamber 58, the body 10 is provided with a bore 68 in which is arranged in sealed relation thereto an axial extension 69 formed on the cylinder 55. This extension forms with the bore 68 a chamber 70 communicating with the chamber 64 through a passage 71. The chamber 70 has an outlet port 72, preferably provided with a conventional residual pressure valve (not shown) leading to one end of a hydraulic line 73, the other end of which is connected to the rear wheel brake cylinders 74.

The master cylinder body 10 is provided with a preferably integral reservoir 78 partitioned as at 79 to form reservoir chambers 80 and 81. The reservoir is provided with the usual cover, omitted in FIGURE 1. The usual replenishing port 82 supplies fluid from the reservoir chamber 80 to the master cylinder chamber 21, just ahead of the seal 13. The chamber 35 also conventionally communicates with the reservoir chamber 80 through a larger port 83. The chamber 81 is provided with a passage 85 in which is loosely slidable a pin or stem 86 provided at its left-hand end with a valve 87 normally disengaged from but movable into engagement with a resilient valve seat 88. Normally, the chamber 81 communicates through passage 85 with a passage 89 formed in the inner end of a stem 90, and the passage 89 communicates with the chamber 58 through a passage 91. It will be apparent, therefore, that there is normally communication in the off positions of the parts, between the reservoir chamber 80 and master cylinder 21, and between the reservoir chamber 81 and master cylinder chamber 58.

Beneath and preferably formed integral with the body 11 is an accumulator 95 having a bore 96 therein, the upper forward end of which communicates with the chamber 58 as at 97. A sealed piston 98 is slidable in the bore 96 and forms with the upper forward end of such a bore a chamber 99 which obviously communicates with the chamber 58. The lower rear end of the bore 96 forms a chamber 100 communicating with the reservoir chamber 81 through a passage 101 the lower end of which is constricted as at 102 for a purpose to be described. Since the reservoir chamber 81 is at atmospheric pressure, the chamber 100 under normal conditions is at the same pressure. A relatively strong spring 104 is arranged in the chamber 100 and engages at opposite ends against the piston 98 and sealed closure plug 105.

An elongated chamber 108 is arranged in the upper forward end of the accumulator in axial alignment with the piston 98 and normally communicates with the chamber 99 through a port 109. A stem 110, smaller than the port 109, is carried by the piston 98 and projects through the port 109 to normally unseat a ball valve 111 urged to closed position by a spring 112. When the piston 98 moves downwardly and rearwardly under conditions to be described, the spring 112 will seat the ball valve 111 and prevent fluid from flowing from the chamber 108 into the chamber 99. The chamber 108 is in fixed communication through a passage 113 with the chamber 70.

As stated, the reservoir chamber 81 normally is in constant communication with the chamber 58, the valve 87 being normally open. Such position of this valve is maintained by an arm 115 apertured or yoked to engage the stem 86 between collars 116. The arm 115 extends over the partition 79 and then downwardly and rearwardly thereof with its rearward extremity extending through the port 83 into the chamber 35 and engaging back of the apertured shoulder 118 against which the seal 13 seats. A tension spring 119 has one end hooked into the arm 115 and has its upper end hooked into a recess 120 in the body 10. The spring 119 urges the arm 115 forwardly and such movement takes place, together with the closing of the valve 87, upon initial forward movement of the plunger 12.

As further referred to below, the mechanism operates in two stages. In the first one there is a relatively rapid displacement of pressure into the fluid lines. The force applied to the push rod has a reference line 125 in FIGURE 2, while the output hydraulic pressures have reference to the line 126 in FIGURE 2. Push rod forces and hydraulic pressures increase from the zero point 127 to the point 128 in FIGURE 2, beyond which hydraulic pressures to the front wheels increase relatively more rapidly, as indicated by the line 129, than hydraulic pressures to the rear wheels, as indicated by the line 130.

In FIGURE 3, the hydraulic pressure ratios to the front and rear wheel cylinders are graphically represented. These pressures increase from the zero point 127 in a 1:1 ratio up to the end of the first stage of operation, again indicated by the numeral 128. Beyond this point, when the second stage of operation comes into play, the relative hydraulic pressures will take place as indicated by the line 132, the rate of hydraulic pressure increase being more rapid in the front wheel cylinders than in the rear wheel cylinders. The ideal ratio curve would be as indicated by the line 133 to compensate for vehicle weight transfer, the line 132 being a compromise relatively closely approximating the ideal curve.

*Operation*

All of the parts are shown in their normal positions in FIGURE 1. The port 82 is uncovered so that there is communication between the reservoir chamber 80 and the master cylinder chamber 21. The valve 87 will be open, and accordingly, the reservoir chamber 81 communicates through passages 89 and 91 with the master cylinder chamber 58. The port 65 also will be open so that fluid at atmospheric pressure will be present in the chamber 64.

Movement of the push rod 15 to the left by the brake pedal or by the motor moves the plunger 12 to the left and closes the port 82, thus trapping hydraulic fluid in the chamber 21. Initial movement of the plunger 12 frees the spring 119 to move the arm 115 to the left to close the valve 87, thus disconnecting the master cylinder chamber 58 from the reservoir. Fluid is displaced from chambers 21 and 49 to the front wheel cylinders through the port 24 and line 25. Fluid can flow from the chamber 49 past the lip of the cup 23 into the chamber 21, or around the by-pass valve 32 and port 43 into the chamber 21. After pressure in the chamber 49 increases to a predetermined point, the spring 59 yields and fluid in the chamber 49 acts as a hydraulic link to impart movement to the plunger 48. The plunger 48 moves to the left to displace fluid from the chambers 58 and 64. Fluid will be displaced from the chamber 58 at a greater volumetric rate than from the chamber 64, and fluid from the chamber 58 passes the lip of the sealing cup 63 carried by the piston 62. Fluid from the chamber 58 also is free to pass through the opening 97 into the chamber 99, through passage 109 into the cylinder 108 and thence through passage 113. Thus, fluid will be displaced from the chambers 58 and 64 through the line 73 into the rear wheel brake cylinders 74.

During such initial operation, the piston 98 remains stationary due to the action of the relatively heavy spring 104. Thus fluid is displaced by the large area pistons 20 and 48 to quickly set the brakes with a minimum of pistol travel. When a certain predetermined pressure is reached in the chamber 99, the spring 104 yields and the valve 111 closes. From this point on, while the push rod 15 is further operated, fluid from the chamber 58 is displaced into the chamber 99 of the accumulator and only fluid from the chamber 64 is displaced to the rear wheel cylinders.

Simultaneously with the yielding of the spring 104, the spring 37 also yields to move the O-ring 44 into the bore 31 to close the escape of hydraulic fluid from the chamber 49 into the chamber 21. Thus, only fluid from the chamber 21 is transmitted to the front wheel cylinders while fluid in the chamber 49 is trapped and serves only as a medium to transmit the force of the plunger 12 to the plunger 48. The cross-sectional areas of the chambers 21 and 64 are so proportioned that a relatively larger volume of fluid is transmitted to the front wheel cylinders than to the rear wheel cylinders. As a result, in the second stage of operation now being considered, pressure in the front wheel cylinders increases at a faster rate than that transmitted to the rear wheel cylinders from the chamber 64. The ratio change is illustrated in FIGURE 3. In the first stage of operation, before the yielding of the springs 37 and 104, the hydraulic pressure ratios in the front wheel cylinders will be 1:1, which is diagrammatically represented between the points 127 and 128 in FIGURE 3. Beyond the point 128 the front and rear wheel pressures progressively change as indicated by the line 132, the pressure increasing more rapidly in the front wheel cylinders than in the rear wheel cylinders, as stated. The relation between the push rod forces and hydraulic pressure outputs is illustrated in FIGURE 2. Again, a certain ratio is maintained from the zero point 127 to the point 128 after which, while push rod forces increase, the pressure increase in the front wheel cylinders is more rapid as indicated by the line 129 than the increase in rear wheel pressures as indicated by the line 130.

In the retractile movement of the push rod 15, the plungers 12 and 48 move to the right whereby chambers 21 and 64 expand so that hydraulic pressures therein decrease. The volume of the chamber 49 remains the same, but the capacity of the chamber 58 expands and receives fluid from the chamber 99 since, as pressure in the chambers 58 and 99 decreases, the spring 104 moves the piston 98 upwardly and forwardly toward its normal off position. The pressures decrease along the same lines on which they increased (lines 129 and 130, FIGURE 2). When the point 128 is reached, pressures in the chambers 64 and 99 will be equal, the piston 98 will have reached its off position and the valve 111 will be opened by the stem 110. Pressures in the chambers 21 and 49 at this point also will be equal, and the spring 37 will open the valve 32 to re-establish communication between the chambers 21 and 49. From this point on, fluid in the brake lines returns to all of the chambers until the master cylinder plungers are in their released positions and pressures in the brake lines are relieved. In the released positions of the parts, compensating ports 82 and 65 will be opened and the valve 87 will be opened by the shoulder 118. Accordingly, as described above, the brake lines communicate with the respective reservoirs except as pressure is maintained in such lines by the residual pressure valves (not shown) preferably employed.

The passage 101 is restricted at 102 so that in a panic brake application it is not possible for pressures in the chamber 99 to move the piston 98 prematurely. If this occurred, the building up of normal pressures in the wheel cylinders would be prevented.

In case of the failure of one brake circuit, the other will be operative to apply one set of brakes in the same manner as in a conventional divided output master cylinder. For example, if the brake line 25 should fail, pressure will not be built up in the chamber 49 and the plunger 12 will move into engagement with the plunger 48 to directly move the latter and operate the rear brakes. Conversely, if the line 73 should break, no pressure can be built up in the chambers 58 and 64. Therefore, upon movement of the plunger 12, the plunger 48 will move freely to its limit of movement, beyond which point pressure will be built up in the chambers 21 and 49 to apply the front brakes.

From the foregoing, it will be apparent that the present construction provides far more than the advantages of a conventional divided output master cylinder. Initial relatively short movement of the push rod 15 will displace substantial volumes of fluid to both sets of wheel cylinders to set the brakes, after which fluid will be displaced at a lower rate but at higher pressures to both sets of wheel cylinders. Fluid will be displaced at a somewhat higher rate to the front brakes which will tolerate relatively heavy pressures, while a lower rate of pressure build-up will occur in the rear brakes, thus tending to prevent the locking of the rear wheels. The present mechanism therefore, in effect, compensates for vehicle body transfer without the addition of any means responsive to body weight transfer for controlling braking in the second stage of operation. There will be a gradual transition from the first to the second stage and stepless modulation during both the increasing and decreasing of the braking effort.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. In a hydraulic braking system including two sets of wheel cylinders to apply the brakes, in combination, a master cylinder, a first and second fluid displacing means therein to displace fluid therefrom to one set of wheel cylinders, a third and fourth fluid displacing means in said master cylinder to displace fluid to the other set of wheel cylinders, said third and fourth fluid displacing means being adapted to be operated by fluid pressure from said second fluid pressure displacing means, an expansible chamber adapted to yield at a predetermined hydraulic pressure to receive fluid from said fourth fluid pressure displacing means, and valve means to provide communication from said second and fourth fluid displacing means to the first and second set of wheel cylinders, respectively, below a predetermined hydraulic pressure and to close above such predetermined pressure, said first fluid displacing means being permanently connected to one set of wheel cylinders and said third fluid displacing means being permanently connected to the other set of wheel cylinders.

2. In a hydraulic braking system including two sets of wheel cylinders to apply the brakes, in combination, a master cylinder, a first and second fluid displacing means therein to displace fluid therefrom to one set of wheel cylinders, a third and fourth fluid displacing means in said master cylinder to displace fluid to the other set of wheel cylinders, said third and fourth fluid displacing means being adapted to be operated by fluid pressure from said second fluid pressure displacing means, an expansible chamber adapted to yield at a predetermined hydraulic pressure to receive fluid from said fourth fluid pressure displacing means, valve means to provide communication from said second and fourth fluid displacing means to the first and second set of wheel cylinders, respectively, below a predetermined hydraulic pressure and to close above such predetermined pressure, said first fluid displacing means being permanently connected to one set of wheel cylinders and said third fluid displacing means being permanently connected to the other set of wheel cylinders, a normally open duct between said fourth and third fluid displacing means, and means for closing said duct when said expansible chamber yields and receives hydraulic pressure from said fourth fluid displacing means.

3. In a hydraulic braking system including two sets of wheel cylinders to apply the brakes, in combination, a master cylinder, a first and second fluid displacing means therein to displace fluid therefrom to one set of wheel cylinders, a third and fourth fluid displacing means in said master cylinder to displace fluid to the other set of wheel cylinders, said third and fourth fluid displacing means being adapted to be operated by fluid pressure from said second fluid pressure displacing means, an expansible chamber communicating with said fourth fluid displacing means and having a pressure movable element biased to a normal position tending to maintain said expansible chamber at minimum volume, a normally open duct between said expansible chamber and one set of wheel cylinders, said third fluid displacing means being permanently connected to said one set of wheel cylinders, said first fluid displacing means being permanently connected to the other set of wheel cylinders, said first and second fluid displacing means normally communicating with each other and being cut off from such communication when pressure in said second fluid displacing means increases to a predetermined point, and means for closing said normally open duct when said pressure movable member moves upon an increase in pressure in said expansible chamber.

4. In a hydraulic braking system including two sets of wheel cylinders to apply the brakes, in combination, a master cylinder, first and second fluid displacing devices each having a hydraulic chamber connected to one set of wheel cylinders, each device comprising a pair of fluid displacing elements one of which operates in the associated hydraulic chamber, a second chamber in each device in which the other fluid displacing element thereof operates, fluid in the second chamber of said first device being arranged between fluid displacing elements of the two devices to act as a hydraulic link to transmit movement from said first device to said device, the two chambers of each device being normally connected with each other, means for transmitting movement to said first device, means operative upon a predetermined increase in pressure in said second chamber of said first device for closing communication between the chambers of said first device whereby fluid is displaced only from the hydraulic chamber of such device to the associated wheel cylinders, means operative when fluid displaced from said second device increases to a predetermined point for disconnecting the second chamber of said second device from the associated wheel cylinders, and an expansible chamber device for receiving fluid from the second chamber of said second device when pressure transmitted to the associated set of wheel cylinders increases above said predetermined point.

5. A system according to claim 4 wherein said expansible chamber device is an accumulator comprising a cylinder, a pressure movable element therein, means biasing such element toward one end of said cylinder, such end of said cylinder forming a chamber communicating with the second chamber of said second device.

6. A system according to claim 4 wherein said expansible chamber device is an accumulator comprising a cylinder, a pressure movable element therein, means biasing such element toward one end of said cylinder, such end of said cylinder forming a chamber communicating with the second chamber of said second device, said means for disconnecting said second chamber of said second device from the associated wheel cylinders comprising a valve between said accumulator chamber and the associated wheel cylinders and biased to closed position, said pressure movable element having a portion normally engaging and unseating said valve.

7. A system according to claim 4 wherein said expansible chamber device is an accumulator comprising a cylinder, a pressure movable element therein, means biasing such element toward one end of said cylinder, such end of said cylinder forming a chamber communicating with the second chamber of said second device, a reservoir, the other end of said cylinder forming a second accumulator chamber, and a restricted duct connecting said second accumulator chamber to said reservoir to limit the rate of flow of fluid from said second accumulator chamber to said reservoir.

8. In a hydraulic brake system including two sets of wheel cylinders to apply the brakes, in combination, a master cylinder, first and second fluid displacing devices each having a high-pressure hydraulic chamber connected to one set of wheel cylinders, each device comprising a pair of fluid displacing elements one of which is of limited area and operates in the associated high-pressure chamber, a low-pressure chamber in each device, the other fluid displacing element of each device being of larger area and operating in said low-pressure chamber, one of said low-pressure chambers being between the larger-area displacing elements of said two devices so that fluid in such chamber acts as a hydraulic link to transmit movement from said first device to said second device, means for transmitting movement to said first device, the chambers of said first device normally communicating with each other, the low-pressure chamber of said second device normally communicating with the associated wheel cylinders, means operative upon a predetermined increase in pressure in the low-pressure chamber of said first device for disconnecting the chambers thereof from each other, and means operative upon a predetermined increase in pressure in the chambers of said second device for disconnecting the low-pressure chamber thereof from the associated wheel cylinders and for accommodating fluid displaced from such chamber.

9. In a hydraulic brake system including two sets of wheel cylinders to apply the brakes, in combination, a master cylinder, first and second fluid displacing devices each having a high-pressure hydraulic chamber connected to one set of wheel cylinders, each device comprising a pair of fluid displacing elements one of which is of limited area and operates in the associated high-pressure chamber, a low-pressure chamber in each device, the other fluid displacing element of each device being of larger area and operating in said low-pressure chamber, one of said low-pressure chambers being between the larger-area displacing elements of said two devices so that fluid in such chamber acts as a hydraulic link to transmit movement from said first device to said second device, means for transmitting movement to said first device, the chambers of said first device normally communicating with each other, the low-pressure chamber and high-pressure chamber of said second device normally communicating with each other, means operative substantially simultaneously upon a predetermined increase in pressure in said low-pressure chambers for closing communication between the chambers of said first device and between the chambers of said second device, and means operative upon the closing of communication between the chambers of said second device for accommodating fluid displaced from the low-pressure chamber of said second device.

10. A system according to claim 9 wherein the means for accommodating fluid from the low-pressure chamber of said second device comprises an accumulator having a chamber communicating with the low-pressure chamber of said second device and a pressure responsive element biased to a position tending to hold said accumulator chamber at minimum capacity and yieldable when pressure in said accumulator chamber increases to said predetermined point.

11. A system according to claim 10 having a reservoir, said accumulator having a second chamber at the side of said pressure responsive element opposite the first-named accumulator chamber, and a restricted duct connecting said second accumulator chamber to said reservoir to restrict the flow of fluid from said second accumulator chamber to said reservoir.

12. In a hydraulic brake system including two sets of wheel cylinders to apply the brakes, in combination, a master cylinder, first and second fluid displacing devices each having a high-pressure hydraulic chamber connected to one set of wheel cylinders, each device comprising a pair of fluid displacing elements one of which is of limited area and operates in the associated high-pressure chamber, a low-pressure chamber in each device, the other fluid displacing element of each device being of larger area and operating in the associated low-pressure chamber, one of said low-pressure chambers being between the larger-area displacing elements of said two devices so that fluid in such chamber acts as a hydraulic link to transmit movement from said first device to said second device, means for transmitting movement to said first device, the chambers of each device normally communicating with each other, means operative upon a predetermined increase in the low-pressure chamber of said first device for disconnecting the chambers thereof from each other, means operative upon predetermined increase in pressure in the chambers of said second device for disconnecting the chambers of such device from each other, means for accommodating fluid displaced from the low-pressure chamber of said second device when the two chambers of such device are disconnected from each other, a reservoir, a replenishing port normally connecting said reservoir to the high-pressure chamber of said first device and adapted to be closed upon initial movement thereof, and means operative upon initial operation of said first device for closing communication between said reservoir and the low-pressure chamber of said second device.

13. A system according to claim 12 wherein the means normally connecting said reservoir to the low-pressure chamber of said second device comprises a passage having a normally open valve therein biased to closed position, and mechanical means connected between such valve and the fluid displacing element of said first device whereby said valve closes when the last-named fluid displacing element is initially operated.

14. A system according to claim 12 wherein the means for accommodating fluid displaced from said low-pressure chamber of said second device comprises a housing, and a pressure-movable member therein forming therewith a chamber communicating with said low-pressure chamber of said second device and biased to reduce the capacity of said means for accommodating fluid to a minimum, the means for closing communication between the chambers of said second device comprising a valve biased to closed position and normally held open by said pressure movable member when the latter is in normal position.

15. A system according to claim 12 wherein said means for accommodating fluid from said low-pressure chamber of said second device comprises an accumulator having a housing, a pressure-movable member having one side forming with said housing a chamber communicating with said low-pressure chamber of said second device, said means for disconnecting the chambers of said second device comprising a passage communicating at opposite ends with the high-pressure chamber of said second device and with said accumulator chamber, a valve in said passage biased to normal closed position and normally held open by a portion of said pressure movable member, said housing at the opposite side of said pressure-movable member forming a second accumulator chamber, and a constricted passage communicating between said second accumulator chamber and said reservoir to restrict the flow of fluid from said second accumulator chamber to said reservoir.

References Cited in the file of this patent

UNITED STATES PATENTS

| | | |
|---|---|---|
| 2,074,416 | Oliver | Mar. 23, 1937 |
| 2,157,733 | Sessions | May 9, 1939 |
| 2,844,161 | Ostwald | July 22, 1958 |
| 3,021,678 | Pagley | Feb. 20, 1962 |